US009815357B2

(12) United States Patent
Hall

(10) Patent No.: US 9,815,357 B2
(45) Date of Patent: Nov. 14, 2017

(54) TONNEAU COVER SYSTEM WITH CAM LOCKING PROP-ROD

(71) Applicant: Laurmark Enterprises, Inc., Ann Arbor, MI (US)

(72) Inventor: Kenneth J. Hall, Jackson, MI (US)

(73) Assignee: Laurmark Enterprises, Inc., Ann Arbor, MI (US)

( * ) Notice: Subject to any disclaimer, the term of this patent is extended or adjusted under 35 U.S.C. 154(b) by 0 days.

(21) Appl. No.: 15/096,764

(22) Filed: Apr. 12, 2016

(65) Prior Publication Data

US 2017/0291478 A1    Oct. 12, 2017

(51) Int. Cl.
*B60P 7/02* (2006.01)
*B60J 7/14* (2006.01)
*B60J 7/19* (2006.01)

(52) U.S. Cl.
CPC .............. *B60J 7/141* (2013.01); *B60J 7/198* (2013.01)

(58) Field of Classification Search
CPC .................................. B60J 7/141; B60J 7/198
See application file for complete search history.

(56) References Cited

U.S. PATENT DOCUMENTS

| 8,960,765 B2* | 2/2015 | Facchinello | B60J 7/141 296/100.06 |
| 2016/0114666 A1* | 4/2016 | Xu | B60J 7/141 296/100.07 |

* cited by examiner

*Primary Examiner* — Lori L Lyjak
(74) *Attorney, Agent, or Firm* — Harness, Dickey & Pierce, P.L.C.

(57) ABSTRACT

A cover includes multiple panels pivotally connected together and foldable between a stacked arrangement and a deployed arrangement. Side rails are attachable to opposite sides of the cargo box and include ledges. The stack can be rotated between an intermediate position and an upward position in which the stack extends above the plane with the upper surface of at least one section disposed at an angle intersecting the plane. A slidable member can slide along a side rail and support a cam lock mechanism moveable between locked and unlocked positions. A link arm can be coupled between the slidable member and the stack to require movement of the slidable member longitudinally along the side rail in response to movement of the stack between the intermediate position and the upward position.

20 Claims, 10 Drawing Sheets

TONNEAU COVER SYSTEM WITH CAM LOCKING PROP-ROD

FIELD

The present disclosure relates to tonneau covers and, more particularly, relates to folding tonneau covers that can be stored in an upwardly angled orientation extending above the cargo box of a truck.

BACKGROUND

This section provides background information related to the present disclosure which is not necessarily prior art.

Trucks such as pickups and trucks having a cargo box can be a quite popular type of vehicle because the cargo box enables objects of various sizes to be placed therein and transported. The cargo box pickup generally has a floor surface or bed that is bounded by a forward wall, opposing side walls and a tailgate providing a rearward wall.

Covers can be used to enclose the cargo box to protect the contents against dirt, debris, and other environmental contaminants, and to improve the aesthetic quality thereof. In some cases, the covers can be formed of generally planar sections or panels hingedly coupled together so they can be folded together in a stacked arrangement to allow access to the cargo box. The stacked panels typically still leave a portion of the cargo box covered.

In some cases the stacked panels can be rotated so the tonneau cover is angled and extends upwardly above the truck box and rests against or generally adjacent the rear window of the passenger compartment of the pickup. Prop-rods can be used to retain the stacked panels in their upwardly angled position, but can require multiple steps, including coupling components together, and/or limited locking options or angular orientations.

SUMMARY

This section provides a general summary of the disclosure, and is not a comprehensive disclosure of its full scope or all of its features.

In accordance with an aspect of the present disclosure, a tonneau cover system for a cargo box of a truck can include a cover having a plurality of sections pivotally connected together. The sections can be foldable between a deployed arrangement and a stacked arrangement. In the deployed arrangement, the sections can be deployed in a generally planar arrangement in which upper surfaces of the sections are aligned in a plane. In the stacked arrangement, the sections can be folded to form a stack. The stack can be rotated between an intermediate position and an upward position in which the stack extends above the plane with the upper surface of at least one section disposed at an angle intersecting the plane. At least one side rail can be attachable to at least one lateral side of the cargo box. A slidable member can include a body slidably coupled to the side rail and a post protruding from the body. A cam lock mechanism can be mounted on the post and movable between a locked position and an unlocked position. In the locked position, the cam lock mechanism can engage the side rail to prevent longitudinal movement of the body along the side rail. In the unlocked position, the body can be permitted to slide longitudinally along the side rail. A link arm can be coupled between the post and the stack to require movement of the slidable member longitudinally along the rail in response to movement of the stack between the intermediate position and the upward position.

In accordance with another aspect of the present disclosure, a tonneau cover system for a cargo box of a truck can include a cover having a plurality of panels pivotally connected together. The plurality of panels can include a forward panel having a forward edge and a rear edge. The panels can be foldable between a deployed arrangement and a stacked arrangement. In the deployed arrangement, the panels can be deployed with the forward panel in a forward position. In the stacked arrangement, the panels can be folded onto the forward panel to form a stack. At least one side rail can be attachable to at least one lateral side of the cargo box. The side rail can include a longitudinally extending ledge and a longitudinally extending open channel adjacent the ledge. A slidable member can include a body received within the open channel and a post extending through a slot of the open channel. A cam lock mechanism can be mounted on the post and movable between a locked position and an unlocked position. In the locked position, a wall of the side rail adjacent the open channel is frictionally sandwiched or clamped between the cam lock mechanism and the body, preventing longitudinal movement of the slidable member along the open channel. In the unlocked position, the slidable member can be permitted to slide along the open channel. A link arm can be coupled between the post and the forward panel. The stack can be rotatable between an intermediate position and an upward position. In the intermediate position, both the forward and rear edges of the forward panel can be adjacent the side rail. In the upward position, the rear edge of the forward panel can be spaced above the forward edge of the forward panel and the side rail. The link arm can be coupled between the post and the forward panel to require movement of the slidable member longitudinally along the open channel throughout movement of the stack between the intermediate position and the upward position.

Further aspects and areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
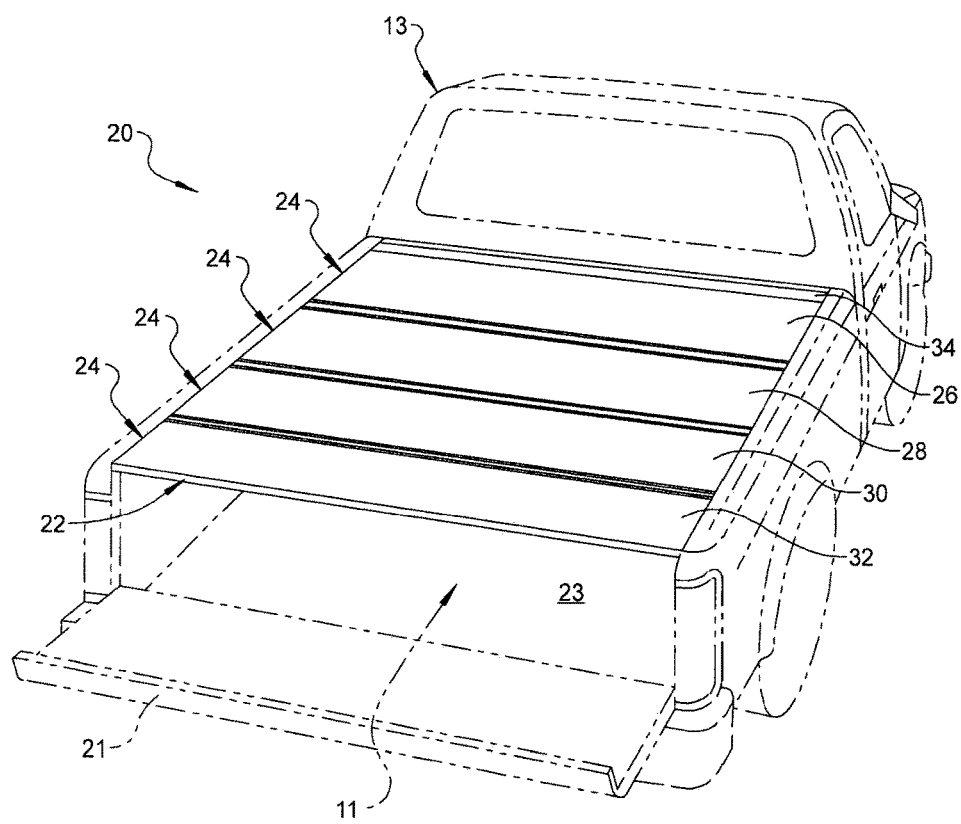
FIG. 1 is a perspective view illustrating a foldable tonneau cover system in accordance with the present disclosure in a deployed, extended or unfolded arrangement covering a cargo box of a pickup truck.

Example embodiments will now be described more fully with reference to the accompanying drawings.

Referring to FIGS. 1 through 10, one example embodiment of a tonneau cover system 20 for covering a truck bed or cargo box 11 is provided. In some cases, the truck bed or cargo box 11 can be part of a pickup truck 13 as shown. Briefly, cargo box 11 can comprise a plurality of sidewalls, namely a lateral or transverse front wall, a pair of opposing longitudinal sidewalls, and a lateral or transverse rear wall or tailgate 21.

In some embodiments, the tonneau cover 22 of the tonneau cover system 20 can include a plurality of panels or sections 24. The panels section 24 of the tonneau cover 22 can comprise a central rigid panel. In other embodiments, the panel sections 24 can comprise a flexible sheet material panel spanning a frame. In some cases, the tonneau cover 22 can include at least four panels 24. In some embodiments, the plurality of panels 24 can be interlockingly coupled to adjacent panels 24 to provide a pivotable or hinged connection therebetween.

The plurality of panels 24 can include a forward panel 26. A remainder of the plurality of panels 24 can include a second panel 28, a third panel 30, and a rearward panel 32. The plurality of panels 24 can be hingedly coupled together to be foldable between a deployed or extended arrangement covering the cargo box 11 (e.g., FIGS. 1 and 2) and a folded or stacked arrangement wherein the panels 24 are stacked upon and overlie the forward panel 26 (e.g., FIG. 3).

The forward panel 26 is hingedly coupled to the transverse front wall of the cargo box 11. In some embodiments, the forward panel 26 is directly hingedly coupled to the front wall. In some embodiments, an intermediate coupling member 34 indirectly hingedly couples the forward panel 26 to the front wall. As an example, the intermediate coupling member 34 can be a small or short panel 34.

When the tonneau cover 22 is in the deployed or extended arrangement (e.g., FIGS. 1 and 2), the bottom face of each panel section 24 can be positioned to face toward the bottom surface or floor 23 of the cargo box 11, with the top face opposite the bottom face and facing upwardly or away from the bottom surface 23. In this deployed or extended arrangement, the primary panel plane of each of the plurality sections 24 can all be substantially coplanar with each other and with a first plane, which first plane can be substantially horizontal in the deployed arrangement.

In some embodiments first and second or left and right side rails 40 can be coupled to the opposite lateral side walls, or longitudinally extending walls, respectively, of the truck box 11. Each of the side rails 40 can include a ledge 42. Opposite lateral sides of the panels 24 can be supported upon the ledges 42 of the side rails 40, respectively, in the deployed arrangement (FIGS. 1 and 2) and the initial stacked arrangement or intermediate position (FIG. 3).

Figure 2:
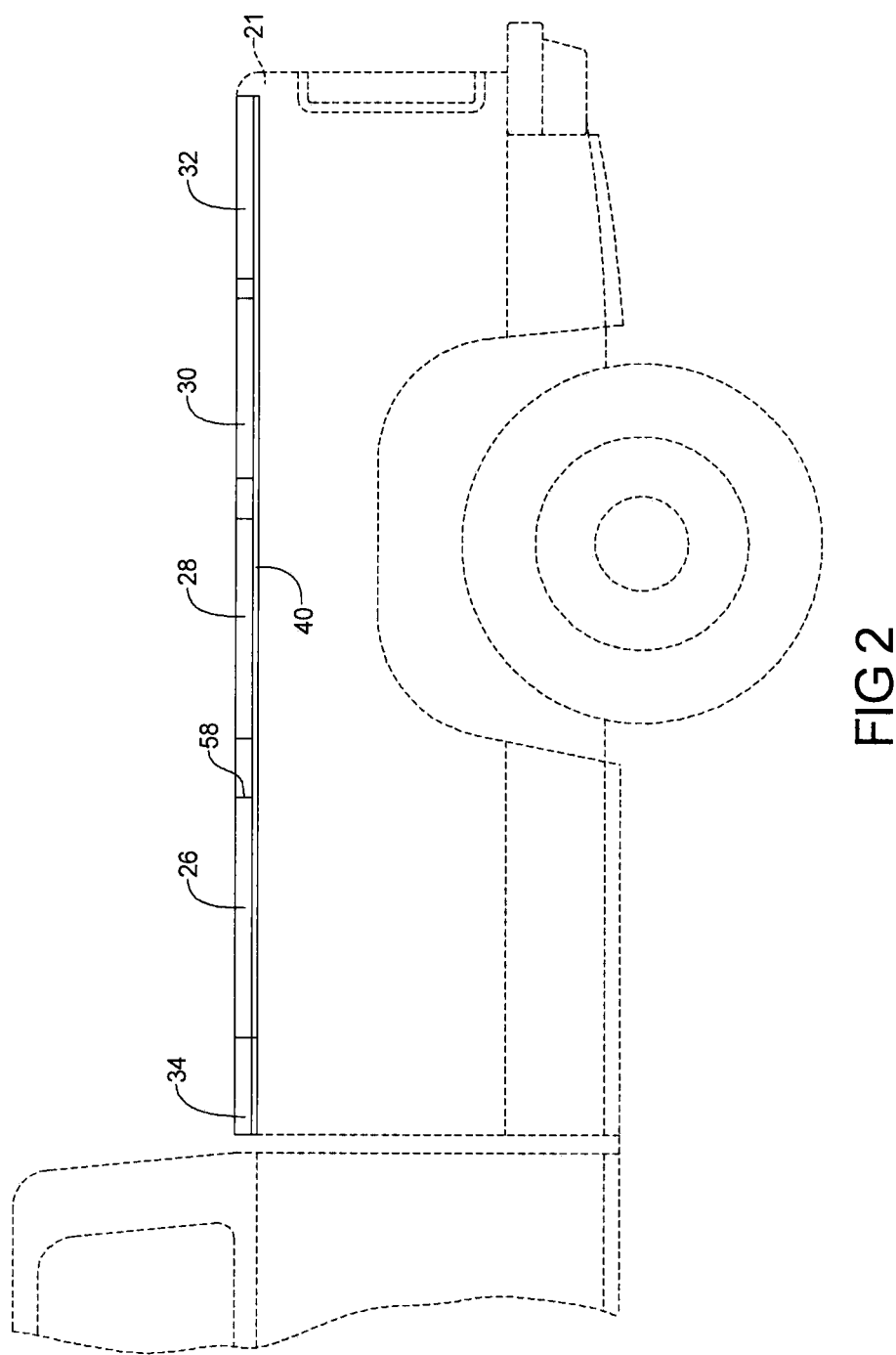
FIG. 2 is a side elevation view of the foldable tonneau cover of FIG. 1 in the deployed, extended or unfolded arrangement covering a cargo box of a pickup truck.
Figure 3:
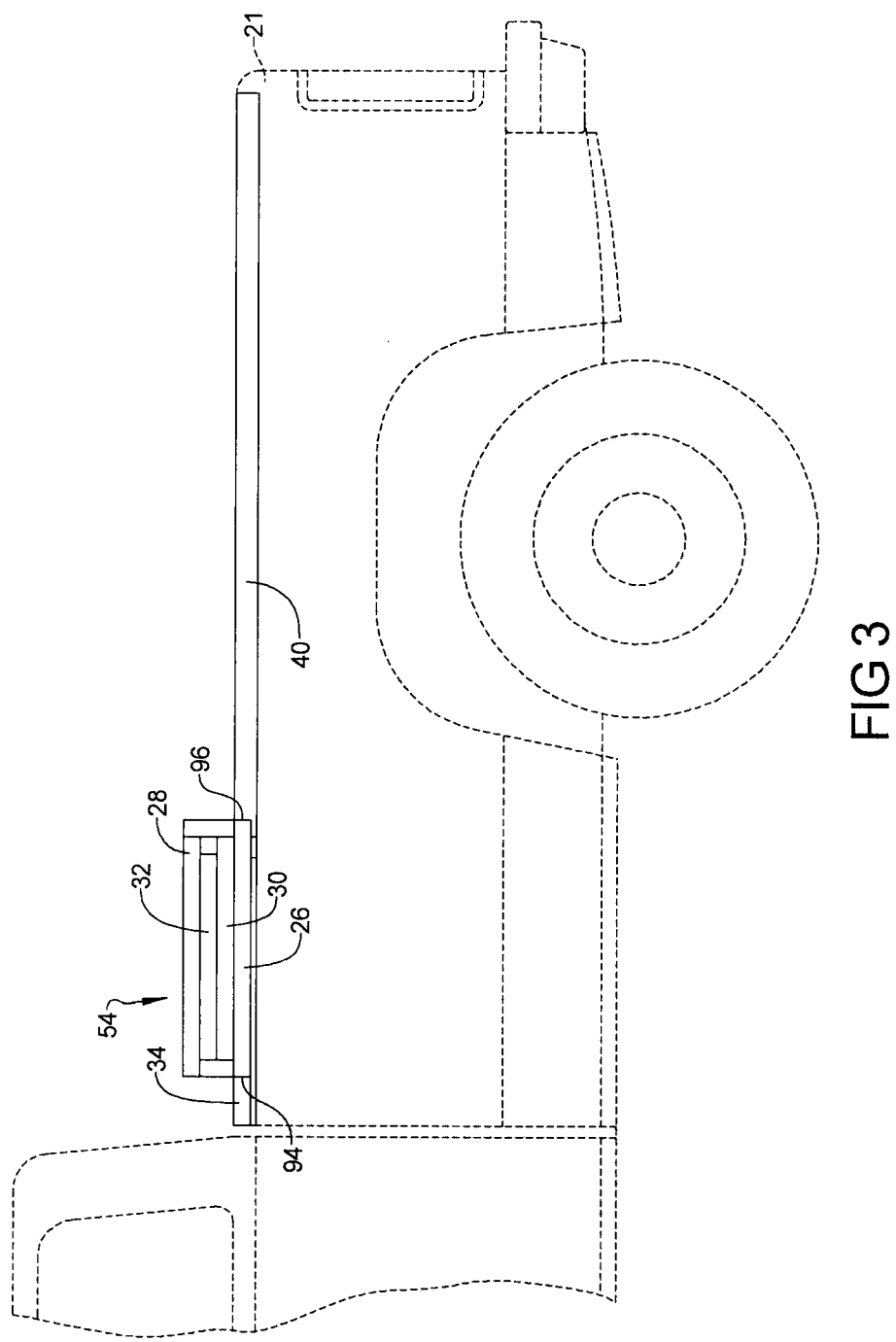
FIG. 3 is a side elevation view of the foldable tonneau cover of FIG. 1 in a stacked arrangement at an intermediate or initial stack position.

The tonneau cover 22 can be folded from the deployed arrangement of FIGS. 1 and 2 into the stacked arrangement of FIG. 3. For example, the rear panel 32 can be pivoted 180 degrees and folded so the top face of the rear panel 32 can be positioned to oppose or face toward the adjacent top face of the third panel 30. This pair of folded panels 32, 30 can then be pivoted 180 degrees and folded onto the second panel 28. This three panel group of folded panels 32, 30, 28 can then be pivoted 180 degrees and folded onto the forward panel 28 to form a completely folded stack 54. Thus, in some embodiments, the tonneau cover 22 can be spiral folded, and the lowermost panel in the stack 54 can be the forward panel 26.

Figure 4:
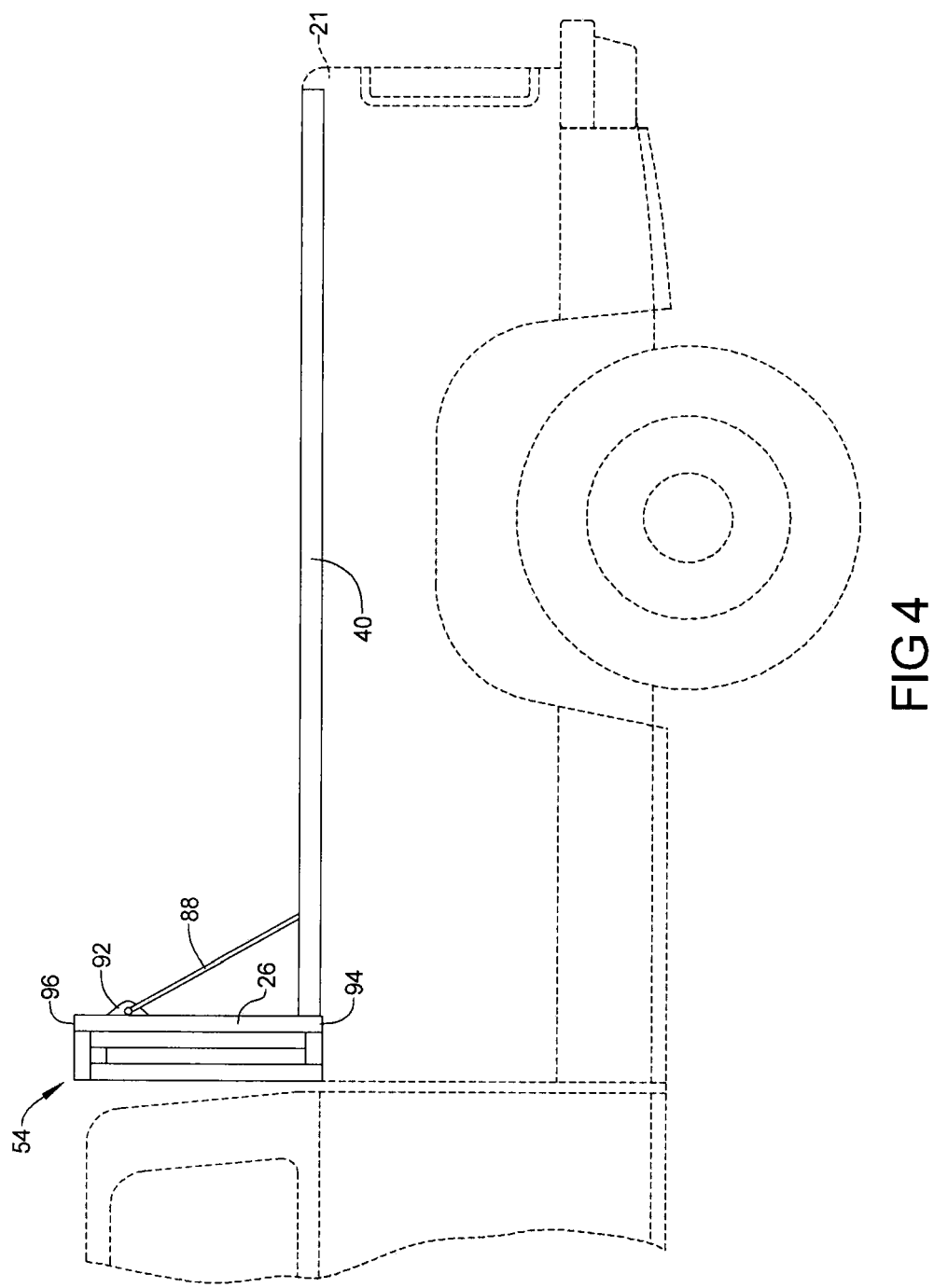
FIG. 4 is a side elevation view of the foldable tonneau cover system of FIG. 1 with the stack in a rotated, upwardly angled position.
Figure 5:
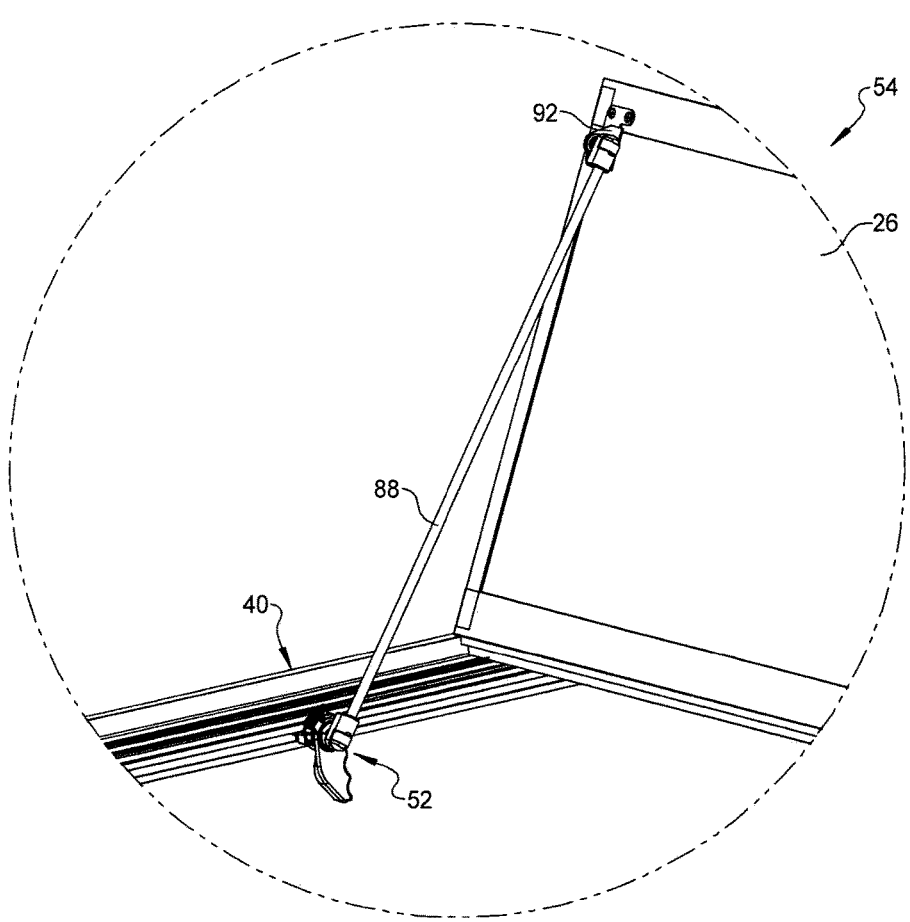
FIG. 5 is an enlarged partial perspective view of the foldable tonneau cover of FIG. 1 in the stacked arrangement and in the rotated, upwardly angled position.
Figure 6:
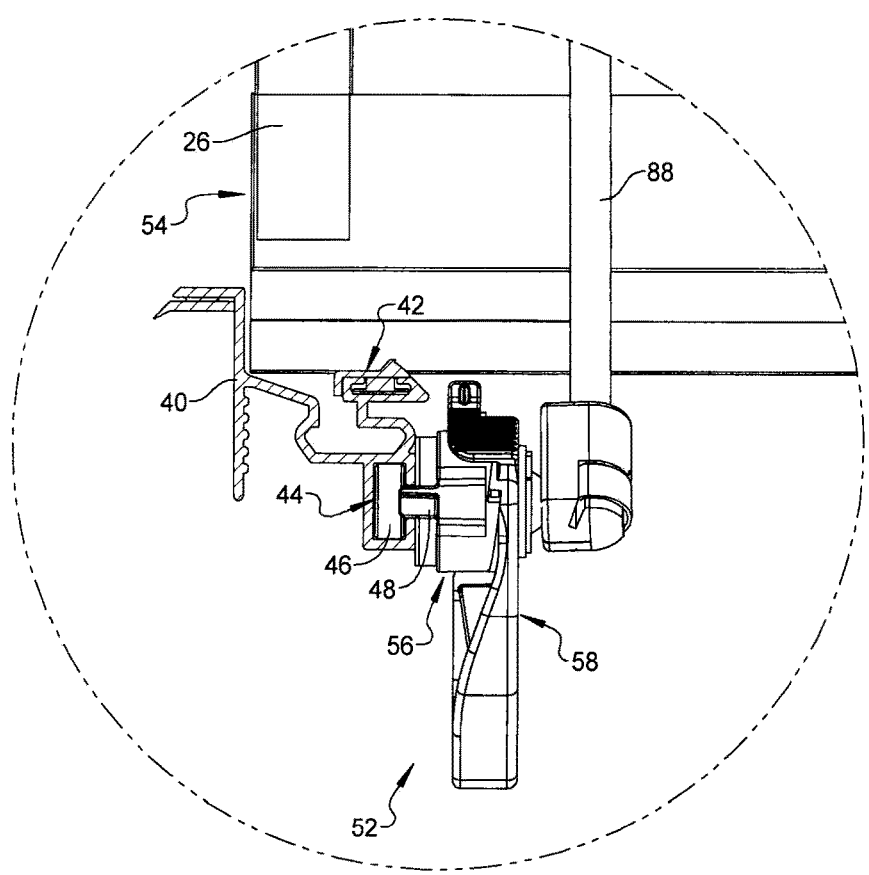
FIG. 6 is an enlarged partial cross-section view of various components of the tonneau cover system of FIG. 1.
Figure 7:
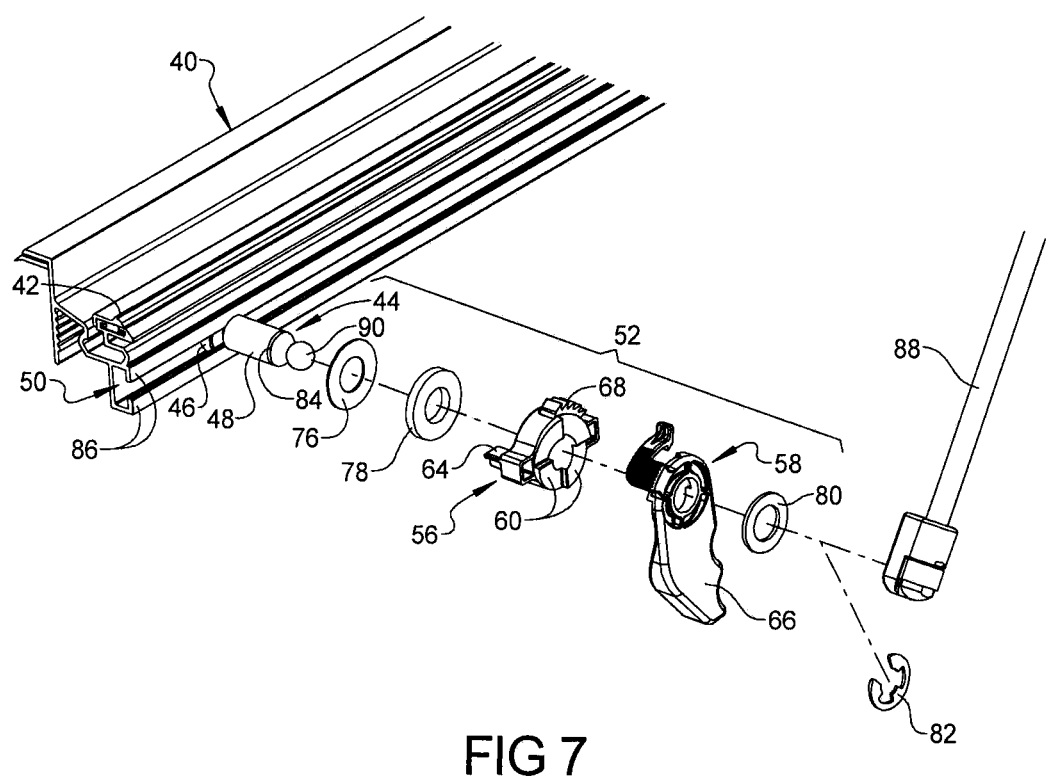
FIG. 7 is a partial exploded perspective view of various components of the foldable tonneau cover system of FIG. 1.
Figure 8:
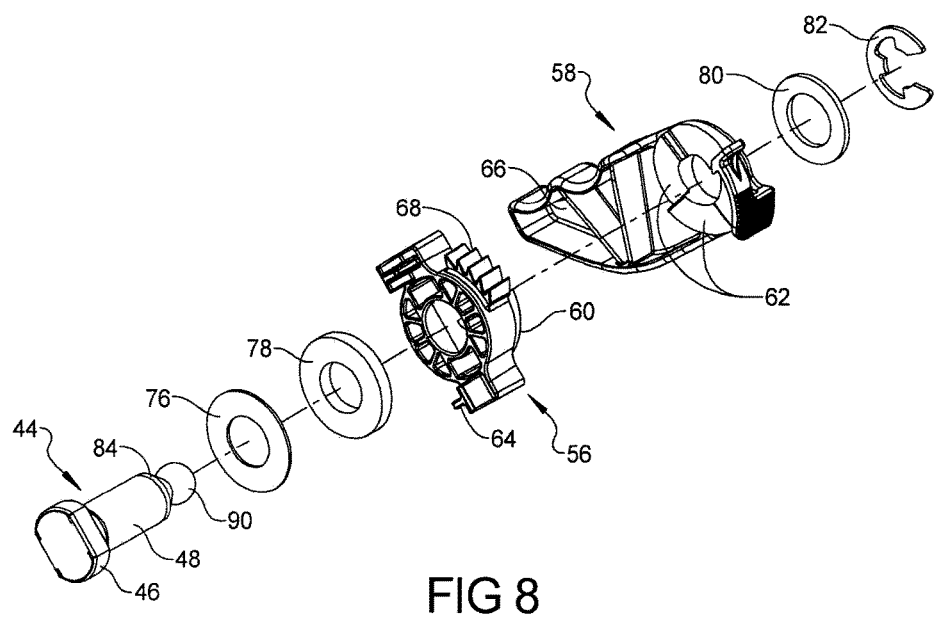
FIG. 8 is an exploded perspective view of various components of the foldable tonneau cover system of FIG. 1.
Figure 9:
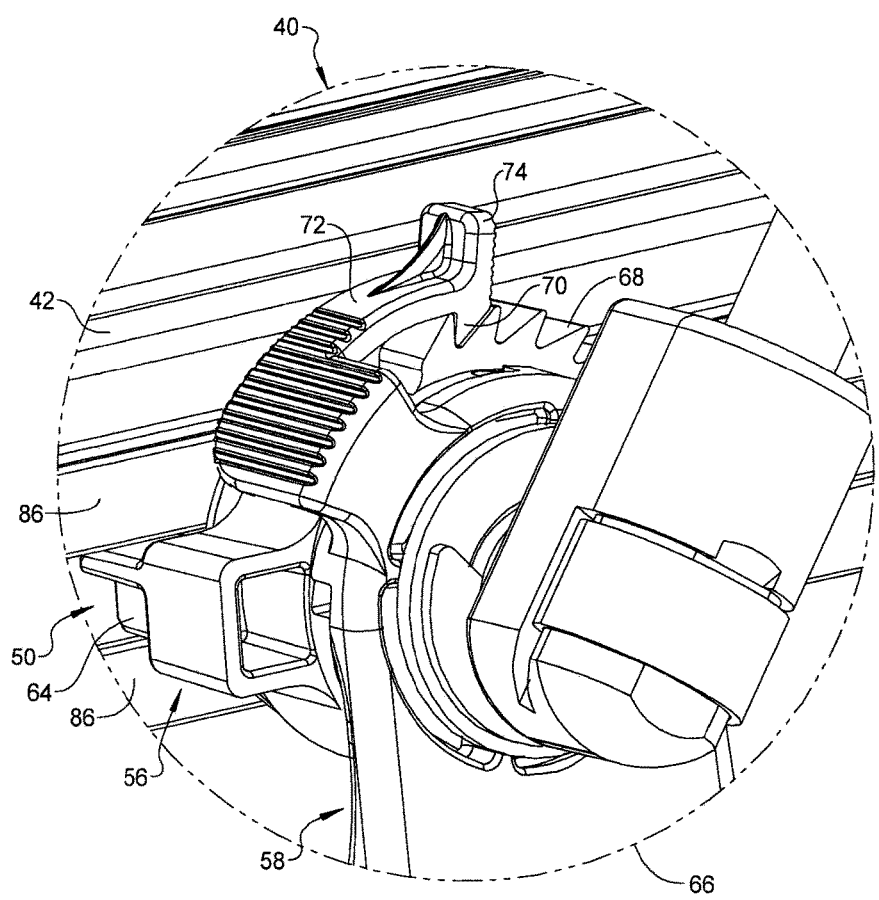
FIG. 9 is a partial enlarged perspective view of various components of the foldable tonneau cover system of FIG. 1, including the cam lock mechanism in a locked position.
Figure 10:
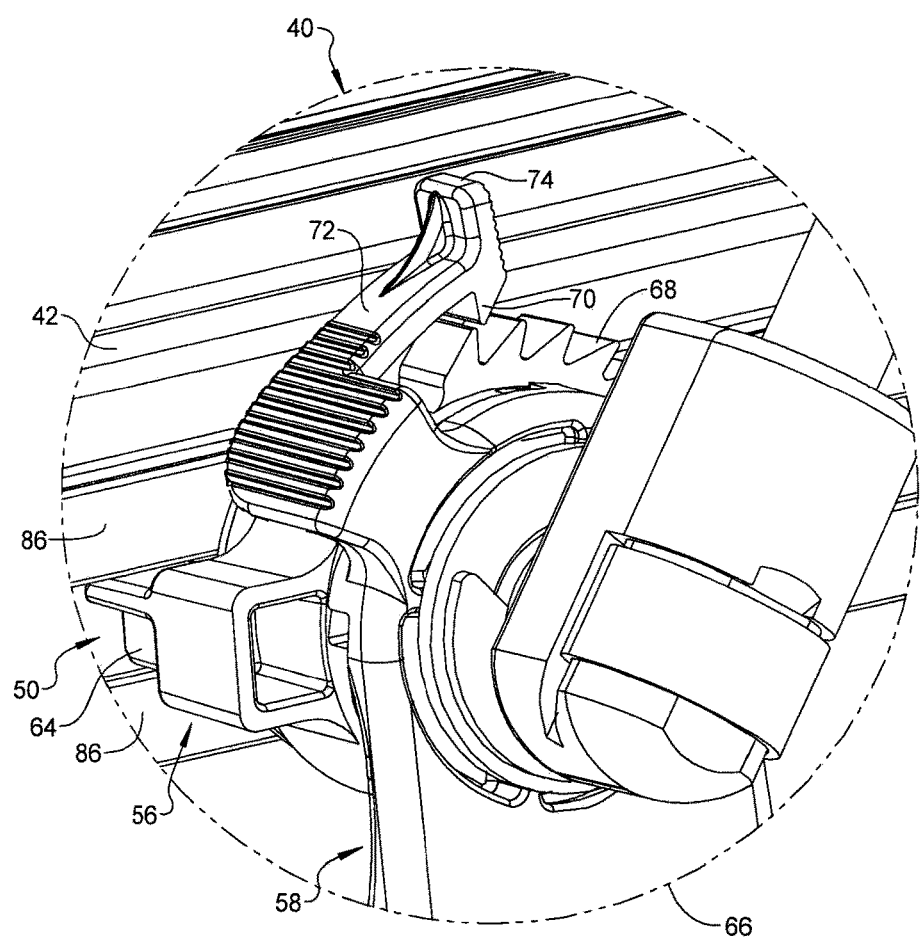
FIG. 10 is a partial enlarged perspective view similar to FIG. 9, but with the cooperating locking teeth disengaged from each other.

FIG. 3 illustrates the stack 54 in the initial stack position (i.e., the initial position where the formation of the stack is completed) of this embodiment. This initial stack position can also be referred to as the intermediate position, since it can also be the position intermediate the deployed position (FIGS. 1 and 2) and the upward or upwardly angled position (FIG. 4). The side rails 40 can be mountable to the cargo box 11 to support the stack 54 on the ledges 42 so that the stack 54 extends above the cargo box 11 in the stacked arrangement.

A slidable member 44 can be slidably coupled to each side rail 40, respectively. The slidable member 44 can include a body 46 and a post 48 extending from the body 46. In some embodiments, the side rail 40 can include a longitudinally extending open channel 50 adjacent the longitudinally extending ledge 42. A cam lock mechanism 52 can be mounted on the post 48.

The cam lock mechanism 52 can include a first cam member 56 and a second cam member 58 with cooperating cam surfaces 60 and 62, respectively, mounted on the post 48. In some embodiments, the first cam member or cam surface member 56 can be a stationary or non-rotatable cam surface member and the second cam member or cam surface member 58 can be a manually rotatable cam surface member. Thus, the first cam member 56 and second cam member 58 can be rotated in a locking direction relative to each other such that the cam surfaces 60 and 62, respectively, engage each other to expand or increase the combined overall width of the cam members 56, 58. When rotated relative to each other in an unlocking direction, the cam surfaces 60, 62 allow the combined overall width of the cam members 56, 58 to lessen or decrease.

In some embodiments, the non-rotatable cam member 56 can include a pair of protrusions 64 that extend into the open channel 50 to prevent rotation of the non-rotatable cam member 56 about the post 48. In some embodiments, the rotatable cam member 58 can include a grasping extension or handle 66 to facilitate manual rotation of the rotatable cam member 58 relative to the non-rotatable cam member 56.

In some embodiments, the non-rotatable cam member 56 can include at least one locking tooth 68 and the rotatable cam member 58 can include at least one cooperating locking tooth 70 positioned to engage the locking tooth or teeth 68 of the non-rotatable member 56 to retain the cam lock mechanism 52 in the locked position. In some embodiments, the locking tooth or teeth 68 of the first cam surface member 58 can be positioned on an outer periphery, such as extending from an outer circumferential wall of the first cam surface member 58. The locking tooth 68 of the first cam surface can be a series of locking teeth 68.

In some embodiments, the cooperating locking tooth 70 of the second cam member 58 can be positioned to extend away from a first side of a resilient extending arm 72. An unlocking tab 74 can extend away from an opposite, second side of the resilient extending arm 72. The resilient extending arm 72 can provide a biasing force tending to cause the cooperating locking tooth or teeth 70 of the second cam member 58 to engage with the locking tooth or teeth 68 of the first cam member 56 when they are positioned adjacent each other. The unlocking tab 74 provides a grasping portion that facilitates a user manually exerting a force on the resilient arm 72 to overcome the resilient or biasing force and move the resilient arm 72 relative to the locking tooth 68 of the first cam member 56 to disengage the cooperating locking teeth 68, 70 and permit the cam lock mechanism 52 to move out of the locked position and toward the unlocked position.

In some embodiments, the cam lock mechanism 52 can further include a fiber or frictional washer 76, a rubber or resilient washer 78, a metal washer 80 and a retaining clip 82. The retaining clip 82 can be received within an annular slot 84 of the post 48 to retain the various components of the cam lock mechanism 52 on the post 48 adjacent the side rail 40.

The cam lock mechanism 52 can be mounted on the post 48 and movable between the locked position and an unlocked position. In the locked position, the cam lock mechanism 52 can engage the side rail 40 to prevent longitudinal movement of the body 46 along the side rail 40. In some embodiments, when in the locked position, a wall 86 of the side rail 40 adjacent the open channel 50 is frictionally sandwiched between the cam lock mechanism 52 and the body 46 preventing longitudinal movement of the slidable member 44 along the open channel 50. In the unlocked position, the slidable member 44, including the body 46, can be permitted to slide longitudinally along the side rail 40. In some embodiments, when in the unlocked position, the body 46 of the slidable member 44 is permitted to slide along and within the open channel 50.

A prop-rod or link arm 88 can be coupled between the slidable member 44 and the forward panel 26. In some embodiments, the link arm 88 can be coupled between a pivot mounting head 90 of the post and a similar pivot mounting head of a bracket 92 coupled to the forward panel 26.

The stack 54 can be rotated between the intermediate position of FIG. 3 and an upward, upwardly angled, or upwardly extending position exemplified by FIG. 4. In some embodiments, in the intermediate position, both the forward edge 94 and the rear edge 96 of the forward panel 26 are adjacent the side rail 40 and, in the upward position, the rear edge 96 of the forward panel 26 is spaced above the forward edge 94 and above the side rail 40. The link arm 88 can be coupled between the post 48 and the stack 54, such as a rear facing side thereof, to require movement of the slidable member 44 longitudinally along the rail 40 in response to and throughout movement of the stack 54 between the intermediate position and the upward position.

As should be apparent, the cam lock mechanism 52 is in an unlocked arrangement or position during rotational movement of the stack 54 between the intermediate position and the upward position. Such rotational movement causes a corresponding longitudinal movement of the slidable member 44 along the open channel 50 of the side rail 40. A user can choose to stop such movement at any point and rotate the cam lock mechanism 52 into the locked arrangement or position, via rotation of the second cam surface member 58 relative to the first cam surface member 56. Thus, the angle of the upper surface of the panels 24 of the stack 54 relative to the side rails 40 when in the upward position can be essentially any angle desired by the user.

Because the slidable member 44 moves with the stack 54, and because the angle is essentially infinitely adjustable, there is no need for a user to select or align the cam lock mechanism 52 with any corresponding locking elements on the side rails 40, nor is there any need to couple the link arm 88 to anything in order to lock the stack 54 in the upward position. In other words, all that is required with the illustrated embodiment is the single step of rotating the cam surface members 56, 58 relative to each other into the locked position, in which the cooperating locking teeth 68, 70 engage each other, and in which the wall 86 of the side rail 40 is frictionally sandwiched between the body 46 of the sliding member 44 and the cam lock mechanism 52.

As the first and second cam members 56 and 58, respectively, are rotated relative to each other toward the locked position, the cooperating cam surfaces 60, 62 engage against each other, causing the overall width of the cam members 56, 58 to enlarge or expand. As a result, the cam members 56, 58 push against the retaining ring 82 and the wall 86 of the side rail 40 and generate a clamping force on the wall 86 sandwiched between the body 46 of the slidable member 44 and the fiber washer 76.

Unlocking the cam lock mechanism 52 is an equally simple one-step operation. All that is required in the illustrated embodiment is to disengage the cooperating locking teeth 68, 70. This allows the cam lock mechanism 52 to move into the unlocked position, in which the overall width of the cam surface members 56, 58 is diminished or lessened. As a result, the clamping force on the side wall 86 is released, which allows the stack 54 to move between the upward position and the intermediate position.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A tonneau cover system for a cargo box of a truck comprising:
   a cover comprising at least one section mountable to the cargo box and rotatable into an upward position in which the section extends above the cargo box;
   at least one side rail;
   a slidable member comprising a body slidably coupled to the side rail and a post protruding from the body;
   a cam lock mechanism mounted on the post and movable between a locked position, in which the cam lock mechanism engages the side rail preventing longitudinal movement of the body along the side rail, and an unlocked position, in which the body is permitted to slide longitudinally along the side rail; and
   a link arm between the post and the section to require movement of the slidable member longitudinally along the side rail in response to movement of the section into the upward position.

2. The tonneau cover system of claim 1, wherein the cover comprises a plurality of sections pivotally connected together, the sections being foldable between a deployed arrangement wherein the sections are deployed in a generally planar arrangement in which upper surfaces of the sections are aligned in a plane, and a stacked arrangement wherein the sections are folded to form a stack, said stack being rotatable between an intermediate position and an upward position in which the stack extends above the plane with the upper surface of the at least one section disposed at an angle intersecting the plane; and the link arm coupled between the post and the stack to require movement of the slidable member longitudinally along the side rail in response to movement of the stack between the intermediate position and the upward position.

3. The tonneau cover system of claim 1, wherein the cam lock mechanism comprises a first cam surface member and a second cam surface member, each being mounted on the post, wherein the first cam surface member includes at least one protrusion extending into the open channel to prevent rotation of the first cam surface member about the post, and wherein the second cam surface member is manually rotatable about the post and relative to the first cam surface member between the locked position and the unlocked position.

4. The tonneau cover system of claim 1, wherein the cam lock mechanism comprises a first cam surface member and a second cam surface member, wherein the first cam surface member is non-rotatably mounted on the post and includes at least one locking tooth, and wherein the second cam surface member is manually rotatable about the post and relative to the first cam surface member between the locked position and the unlocked position and includes at least one cooperating locking tooth positioned to engage the at least one locking tooth to retain the cam lock mechanism in the locked position, and the cooperating locking tooth being movable relative to the locking tooth to disengage the locking tooth and permit the cam lock mechanism to move between the locked position and the unlocked position.

5. The tonneau cover system of claim 4, wherein the at least one locking tooth of the first cam surface member is positioned on an outer periphery of the first cam surface member, and wherein the at least one cooperating locking tooth extends away from a first side of a resilient extending arm of the second cam surface member, and an unlocking tab extends away from an opposite second side of the resilient extending arm.

6. The tonneau cover system of claim 4, wherein the at least one locking tooth of the first cam surface member comprises a series of locking teeth positioned on an outer periphery of the first cam surface member, and wherein the at least one cooperating locking tooth is positioned on a resilient extending arm of the second cam surface member.

7. The tonneau cover system of claim 1, wherein the cam lock mechanism comprises a fiber washer, a rubber washer, a non-rotatable cam surface member and a rotatable cam surface member mounted on the post, wherein rotation of the rotatable cam surface member into the locked position causes the combined rotatable and non-rotatable cam surface members to compress the rubber washer against the fiber washer and the fiber washer against the wall of the side rail adjacent the open channel.

8. The tonneau cover system of claim 7, wherein the cam lock mechanism further comprises a retaining clip mounted in an annular slot of the post and a washer positioned between the retaining clip and one of the non-rotatable cam surface member and the rotatable cam surface.

9. The tonneau cover system of claim 2, wherein the sections are panels.

10. The tonneau cover system of claim 9, wherein the panels are rigid panels.

11. The tonneau cover system of claim 9, wherein the at least one side rail comprises an open channel, and wherein the body is received and slidable within the open channel with the post extending from the open channel.

12. A tonneau cover system for a cargo box of a truck comprising:
- a cover comprising a plurality of panels pivotally connected together, the plurality of panels comprising a forward panel having a forward edge and a rear edge, the panels being foldable between a deployed arrangement wherein the panels are deployed with the forward panel in a forward position, and a stacked arrangement wherein the panels are folded onto the forward panel to form a stack;
- at least one side rail attachable to at least one lateral side of the cargo box, the side rail comprising a longitudinally extending ledge and a longitudinally extending open channel adjacent the ledge;
- a slidable member comprising a body received within the open channel and a post extending through a slot of the open channel;
- a cam lock mechanism mounted on the post and movable between a locked position, in which a wall of the side rail adjacent the open channel is frictionally sandwiched between the cam lock mechanism and the body preventing longitudinal movement of the slidable member along the open channel, and an unlocked position, in which the slidable member is permitted to slide along the open channel; and
- a link arm is coupled between the post and the forward panel;
- wherein the stack is rotatable between an intermediate position, in which both the forward and rear edges of the forward panel are adjacent the side rail, and an upward position, in which the rear edge of the forward panel is spaced above the forward edge of the forward panel and the side rail; and
- wherein the link arm is coupled between the post and the forward panel to require movement of the slidable member longitudinally along the open channel throughout movement of the stack between the intermediate position and the upward position.

13. The tonneau cover system of claim 12, wherein the cam lock mechanism comprises a first cam surface member and a second cam surface member, each being mounted on the post, wherein the first cam surface member includes at least one protrusion extending into the open channel to prevent rotation of the first cam surface member about the post, and wherein the second cam surface member is manually rotatable about the post and relative to the first cam surface member between the locked position and the unlocked position.

14. The tonneau cover system of claim 12, wherein the cam lock mechanism comprises a first cam surface member and a second cam surface member, wherein the first cam surface member is non-rotatably mounted on the post and includes at least one locking tooth, and wherein the second cam surface member is manually rotatable about the post and relative to the first cam surface member between the locked position and the unlocked position and includes at least one cooperating locking tooth positioned to engage the at least one locking tooth to retain the cam lock mechanism in the locked position, and the cooperating locking tooth being movable relative to the locking tooth to disengage the locking tooth and permit the cam lock mechanism to move between the locked position and the unlocked position.

15. The tonneau cover system of claim 14, wherein the at least one locking tooth of the first cam surface member is positioned on an outer periphery of the first cam surface member, and wherein the at least one cooperating locking tooth extends away from a first side of a resilient extending arm of the second cam surface member, and an unlocking tab extends away from an opposite second side of the resilient extending arm.

16. The tonneau cover system of claim 14, wherein the at least one locking tooth of the first cam surface member comprises a series of locking teeth positioned on an outer periphery of the first cam surface member, and wherein the at least one cooperating locking tooth is positioned on a resilient extending arm of the second cam surface member.

17. The tonneau cover system of claim 12, wherein the cam lock mechanism comprises a fiber washer, a rubber washer, a non-rotatable cam surface member and a rotatable cam surface member mounted on the post, wherein rotation of the rotatable cam surface member into the locked position causes the combined rotatable and non-rotatable cam surface members to compress the rubber washer against the fiber washer and the fiber washer against the wall of the side rail adjacent the open channel.

18. The tonneau cover system of claim 17, wherein the cam lock mechanism further comprises a retaining clip mounted in an annular slot of the post and a washer positioned between the retaining clip and one of the non-rotatable cam surface member and the rotatable cam surface.

19. The tonneau cover system of claim 12, wherein each of the panels has an upper surface that extends substantially coplanar with a first plane in the deployed arrangement, and wherein the upper surfaces extend generally orthogonal to the first plane in the storage position.

20. The tonneau cover system of claim 12, wherein the panels are rigid panels.

* * * * *